(12) United States Patent
Ishii

(10) Patent No.: US 6,598,794 B1
(45) Date of Patent: Jul. 29, 2003

(54) DATA MEDIA PROCESSING DEVICE

(75) Inventor: Masayuki Ishii, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/550,046

(22) Filed: Apr. 14, 2000

(30) Foreign Application Priority Data

Apr. 15, 1999 (JP) .......................................... 11-107636

(51) Int. Cl.[7] ................................................. G06K 7/08
(52) U.S. Cl. ........................ 235/449; 235/440; 235/379; 235/380
(58) Field of Search ................................. 235/449, 440, 235/379, 380, 384, 476, 477, 486

(56) References Cited

U.S. PATENT DOCUMENTS

| | | | | |
|---|---|---|---|---|
| 4,900,906 A | * | 2/1990 | Pusic ......................... | 235/381 |
| 5,534,682 A | * | 7/1996 | Graef et al. ................. | 235/379 |
| 5,550,360 A | * | 8/1996 | Muraoka ..................... | 239/384 |
| 5,949,046 A | * | 9/1999 | Kenneth et al. ............. | 235/380 |
| 6,029,888 A | * | 2/2000 | Harvey ....................... | 235/379 |
| 6,109,524 A | * | 8/2000 | Kanoh et al. ................ | 235/381 |
| 6,129,275 A | * | 10/2000 | Urquhart et al. ............ | 235/381 |
| 6,152,309 A | * | 11/2000 | Price et al. .................. | 209/657 |

FOREIGN PATENT DOCUMENTS

| | | |
|---|---|---|
| DE | 196 34 688 A1 | 3/1998 |
| EP | 0 597 135 A1 | 5/1994 |
| GB | 2230635 A * | 10/1990 |
| JP | 407282323 A * | 10/1995 |
| WO | WO 97/22919 | 6/1997 |

\* cited by examiner

*Primary Examiner*—Michael G. Lee
*Assistant Examiner*—Seung H Lee
(74) *Attorney, Agent, or Firm*—Foley & Lardner

(57) ABSTRACT

A data media processing device holds a second data media, such as magnetic card, until a first data media, such as an IC card, is issued. A temporary card holding unit then returns the held second data media thereafter. The data media processing device has a media path switching mechanism to switch to either a first data media issuing path section for issuing the first data media card, or a temporary card holding unit for holding the second data media card, either of which follows the transportation path connecting to the card slot. The first data media issuing path section and the temporary card holding unit form an elevator unit in a single block.

7 Claims, 4 Drawing Sheets

DATA MEDIA PROCESSING DEVICE

FIELD OF THE INVENTION

This invention concerns a data media processing device used in an automated transaction device, such as an Automated Teller Machine (ATM) in a banking system. The media processing device can handle more than two types of media, such as a magnetic card and an IC card, at the same time.

BACKGROUND OF THE INVENTION

In the following description, the data media processing device refers to its use both as a card processing device or a card issuing device. In recent years, it is well known that there are card processing devices which perform the data processing for both magnetic cards and IC cards at the same time.

Discussed below is a shortcoming if such card processing devices are used which process the data for different types of cards.

When a bank customer inserts a banking card (magnetic card) into the ATM to transfer a certain amount of money from the account of the banking card to an IC card used, for example, an electric money system, the magnetic card inserted into the conventional card processing device must be returned to the customer before the IC card is issued. This is because the conventional card processing device has a single transportation path in it, and the magnetic card which is already processed must be returned first in order to issue the IC card. Further, in this configuration, it has no structure to retrieve the card even when the card is detected as an invalid or illegal card.

In actual use, it is preferable to return the banking card (magnetic card) after the entire transaction is completed, because it is necessary for the bank to check the banking card and any unlawful action of the customer. In order to return the banking card, after an IC card is issued, to solve the problem mentioned above, it was necessary to install in the ATM both a magnetic card reader to process magnetic cards, and an IC card reader to transfer the amount separately. This configuration, however, causes the ATM to be large and more expensive.

SUMMARY OF THE INVENTION

One of the objects of the present invention is to provide a data media processing device or a card issuing device which handles the different types of cards efficiently, and which is compact and inexpensive. In order to meet such requirements, the device, according to this invention, not only processes the data after inserting the different types of cards and returns them, but also it has a practical processing structure for temporarily holding and retrieving the first inserted card.

The data media processing device to process the data on a data media according to this invention is provided with a transportation path positioned immediately behind a data media slot to insert, return, and issue the data media therefrom. The device includes a data processing unit to process the data media, a first data media issuing unit to stack a plurality of first data media to be issued, a first data media issuing path section having a first data media issuing path positioned in front of the first data media issuing unit, which issues the first data media, a temporary card holding unit to hold a second data media temporarily, after it is inserted from the data media slot, and a media path switching mechanism to switch to either the first data media issuing path section or the temporary card holding unit, either of which connects to the transportation path.

The first data media issuing path section and the temporary card holding unit are stacked on top of each other in a vertical direction, and the section and unit are switchable and selectively positioned to follow to and from the transportation path, and the data media slot.

The first data media issuing path section and the temporary card holding unit are switchable, in one aspect of the invention, by activating a rack and pinion mechanism.

The temporary card holding unit has a media retrieving unit to retrieve the second data media when the second data media is to be collected.

The temporary card holding unit holds the second data media until the first data media is issued, and the temporary card holding unit returns the held second data media thereafter.

The first data media issuing path section and the temporary card holding unit form an elevator unit, and the elevator unit is a single block which is replaceable for maintenance purposes.

The first data media can be an IC card, and the second data media can be a magnetic card.

In the data media processing device according to the present invention, the first media (such as IC cards) are stacked for issuing from the device, the second media (such as magnetic card) are inserted into the media slot from the outside the device. The second media is, then, transported into the card transportation path, which is located inside the device, and the data on the second media is read by a data processing unit. The second media is, then, transported into the temporary card holding unit for being held temporarily. After this step, the media issuing path unit is moved and leveled to the height of the transportation path by a path switching means. The first media is, then, transported from the media stacker unit, and processed by the data processing unit according to the data of the second media, and issued to the customer. After the first media is issued, then, the second media is returned from the temporary card holding unit to the customer.

The present invention provides two kinds of media processing functions in a single device which has a single transportation path located behind the media entrance. With this configuration, it is possible to return the second media last even though it is inserted first in order to perform the data processing efficiently. The device according to this invention has a simple structure of the transportation path, and this makes the device compact and inexpensive.

Because the device according to the present invention has a path switching means to switch the entire block of the media transportation unit and the temporary card holding unit, it is possible to switch the path easily, for example, without easily deforming the cards.

Because this device is provided with the card retrieving means to retrieve the second media, it is possible to retrieve the second invalid or illegal media temporarily held in the temporary card holding unit inside the device for retrieving purposes.

Because this device is provided with a combined replaceable unit of the media issuing path unit and the temporary card holding unit, it results in ease of operation by an operator when he retrieves the media or performs maintenance work. It is also easy to replace the combined replaceable unit to handle new types of media when the device handles other types of media.

When an IC card is used as the first media mentioned above, and magnetic card is used as the second media, this device can accept the magnetic card, and issue the IC card which is recorded with the data according to the data in the magnetic card. If the magnetic card inserted is invalid or not useful, then the device is able to retrieve the magnetic card. This device according to this invention, thus, can handle both of the magnetic and IC cards efficiently.

BRIEF EXPLANATION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE INVENTION

Figure 1:
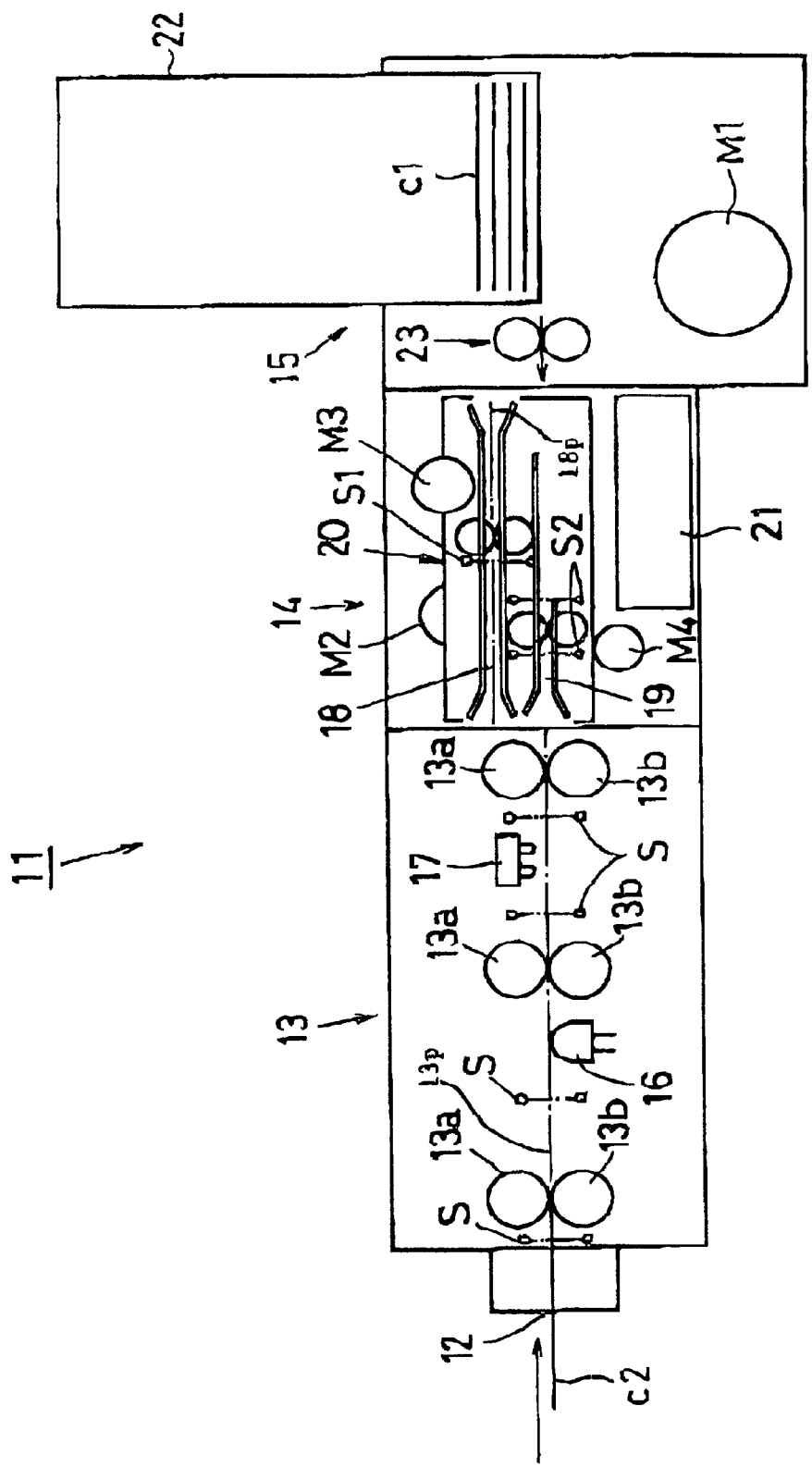
FIG. 1 illustrates a side view of the card issuing device according to the present invention when a magnetic card is inserted and returned.

As shown in FIG. 1, a card issuing device 11 includes a card slot 12 at the front, a card transportation path unit 13 which follows the card slot 12, a card path switching unit 14, and a card issuing unit 15 in that order.

Card transportation path unit 13 is formed with a plurality of pairs of upper transportation rollers 13a, and lower transportation roller 13b which are provided along the card transport direction. Upper and lower transportation rollers 13a, 13b are driven by main transportation motor M1 in forward and reverse directions. These rollers clip and transport an IC card c1 and a magnetic card c2 which are led to the card transportation path unit 13.

Magnetic card head 16 and IC card contact head 17 are provided along card transportation path unit 13. Magnetic card head 16 contacts with the magnetic stripe of magnetic card c2 to read the data, and the IC card contact head 17 contacts with the contact terminal of IC card c1 to write the data.

Card path switching unit 14 is provided behind card transportation path unit 13. It includes an elevator unit 20 and card retrieving box 21. Elevator unit 20 comprises IC card issuing path section 18 for the IC card c1 and temporary card holding unit 19 for the magnetic card c2. These are stacked on top of each other in a vertical direction.

In the elevator unit 20, an IC card issuing path section 18 is provided parallel to the card transportation path unit 13. The IC card issuing path section 18 for the IC card c1 is provided adjacent to a temporary card holding unit 19 for magnetic card c2. When elevator unit 20 goes up, both the IC card issuing path section 18 and the temporary card holding unit 19 are elevated so that one of these can be leveled to the same height as card transportation path 13p. The elevation mechanism in elevator unit 20 is driven by an elevator motor M2 in a forward and a reverse direction, and, in a preferred embodiment, activated by a rack and pinion structure. Elevator unit 20 moves up and down the entire block of the card path switching unit 14 so that either the IC card issuing path section 18 or the temporary card holding unit 19 are at the same level as the card transportation path 13p. In the rest mode or waiting mode, the temporary card holding unit 19 in the elevator unit 20 is level with the card transportation path 13p for accepting the magnetic card c2.

When the temporary card holding unit 19 is in the waiting mode at the same height as card transportation path 13p, the card slot 12 for inserting and returning a card, and the temporary card holding unit 19 for temporarily holding and retrieving the card are aligned in a straight line. When a magnetic card c2 is inserted at the card slot 12 in the waiting mode, the magnetic card c2 is processed at the magnetic card head 16, and further transported to the temporary card holding unit 19 in the card path switching unit 14. Therefore, thus the magnetic card c2 is temporary held there until the transaction is completed.

Figure 2:
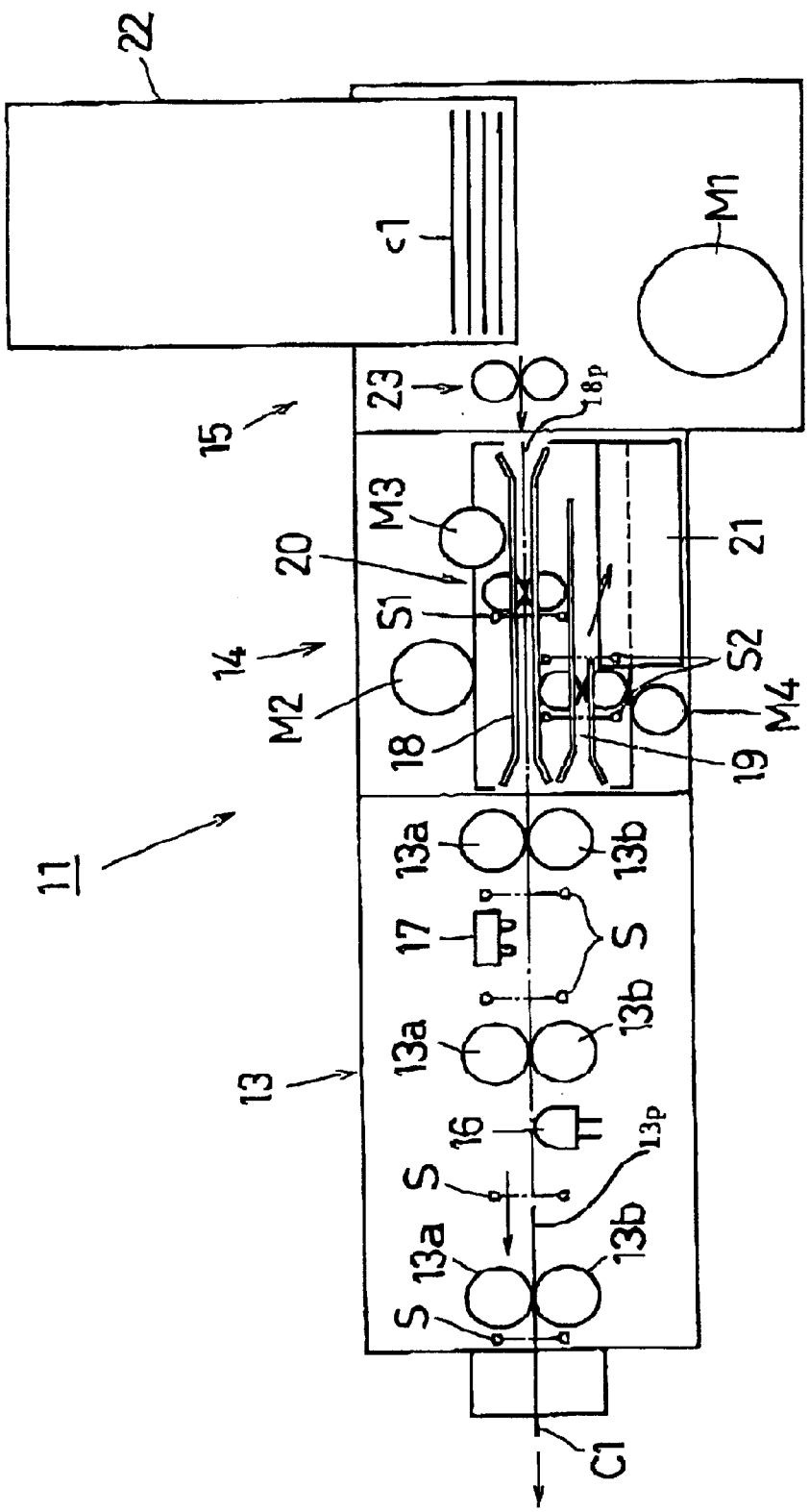
FIG. 2 illustrates the side view of the card issuing device when an IC card is dispensed.

On the other hand, when elevator unit 20 moves lower and IC card issuing path section 18 is level to the card transportation path 13p as shown in FIG. 2, the IC card dispensing slot of IC card cassette 22, card issuing path 18p, and the card transportation path 13p are aligned in a single line to be ready for issuing the IC card. In this mode, when an issuing command for issuing an IC card is input, IC card c1 is dispensed from an IC card cassette 22 of the IC card issuing unit 15, and transported via the card issuing path 18p, and the card transportation path 13p to the card slot 12.

Temporary card holding unit 19 is also used for retrieving the magnetic cards c2. When elevator unit 20 comes down, the rear of the temporary card holding unit 19 faces toward the card retrieving box 21. If the temporary card holding unit 19 receives a retrieving command to retrieve the card, it further transports the magnetic card c2 currently held to card retrieving box 21 which is provided behind the temporary card holding unit 19. The magnetic card c2 is retrieved, for example, if the card is detected as an illegal card or an invalid card.

Card path switching unit 14 is located between card transportation path unit 13 on its front side, and the card issuing unit 15 on its is back side, and replaceable easily as a whole unit. This configuration makes it easy for an operator to access the retrieved cards and to perform the maintenance work. It enables replacement of the entire unit when a financial or other institution wishes to change the type of cards to issue.

Card issuing unit 15 is provided behind card path switching unit 14. It comprises the IC card cassette 22 to stack the IC cards 21 to be issued, and a card dispensing mechanism 23 to dispense each IC card c1.

In the IC card cassette 22, a number of IC cards c1 are stacked in a vertical direction. The bottom slot of IC card cassette 22 is level to the card dispensing mechanism 23, and the dispensing mechanism dispenses the IC card c1 in the horizontal direction. The dispensed IC card c1 travels through card issuing path 18p and the card transportation path 13p to the outside, and is dispensed from card slot 12.

A card transportation sensor S is provided above the card transportation path 13p, a card issuing sensor S1 is provided above the card issuing path 18p, and a card holding sensor S2 is provided in the temporary card holding unit 19 to detect if the magnetic card is already there.

Figure 3:
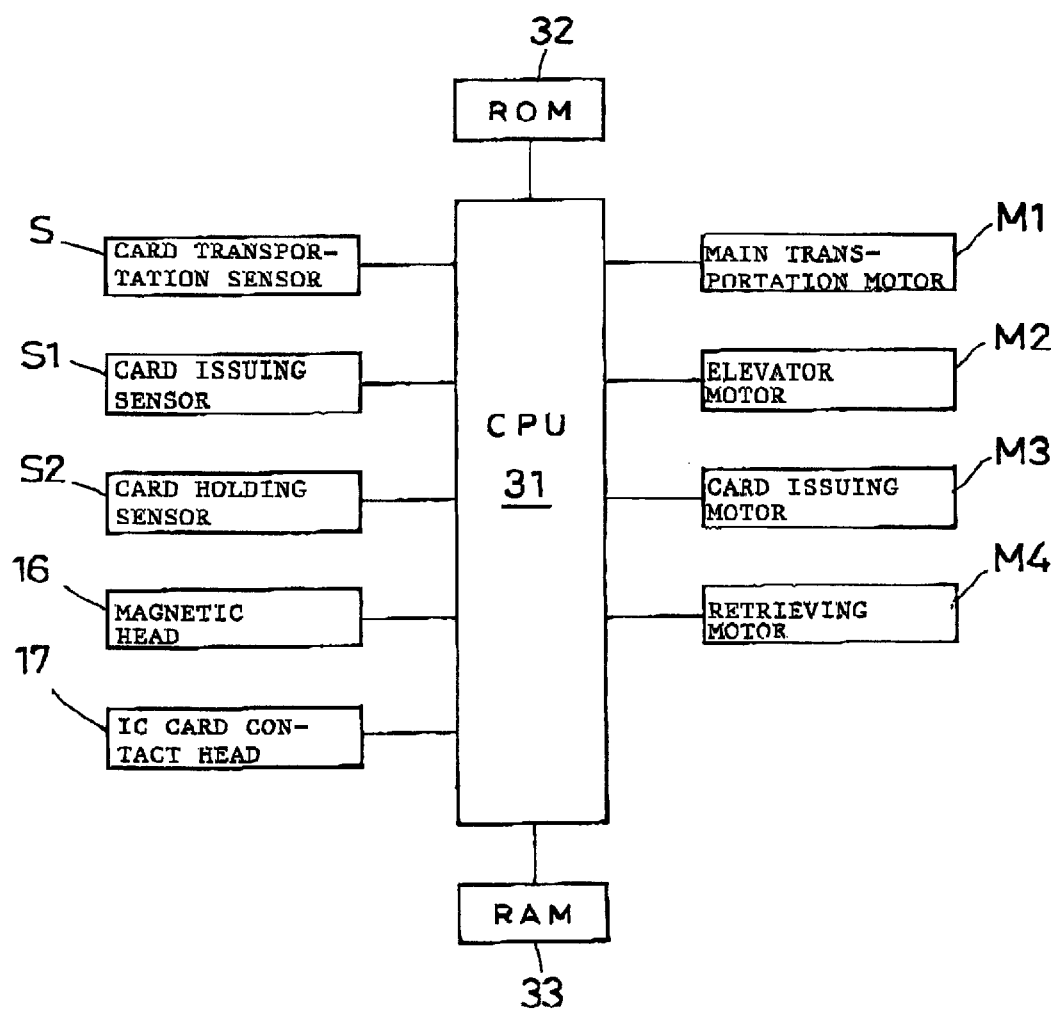
FIG. 3 illustrates a block diagram of the control unit for the card issuing device.

FIG. 3 illustrates a block diagram of the control circuit in the card issuing device 11. A CPU 31 controls each unit according to a program stored in a ROM 32, and control data is read from and written into a RAM 33.

The main transportation motor M1 drives the card transportation path unit 13 in both the forward and reverse directions. The card transportation path unit 13 provides a common path for IC cards c1, and magnetic cards c2.

An elevator motor M2 drives the elevator unit 20 up and down according to operational commands for IC card c1 and magnetic card c2.

A card issuing motor M3 drives the card dispensing mechanism 23, and dispenses an IC card c1 from the IC card cassette 22 during an IC card dispensing mode.

A card holding and retrieving motor M4 drives temporary card holding unit 19 to hold the magnetic card c2 temporally, and further drives, in a forward direction, to retrieve the magnetic card c2 into card retrieving box 21, or in the reverse direction to return the magnetic card c2 from card slot 12.

When each sensor S, S1, and S2 detects if the card is there and how the current status is, CPU 31 controls each motor M1 through M4, and the cards c1 and c2 are transported according to the detection of the sensors. The CPU 31 also controls the transportation according to the read magnetic data.

Figure 4:
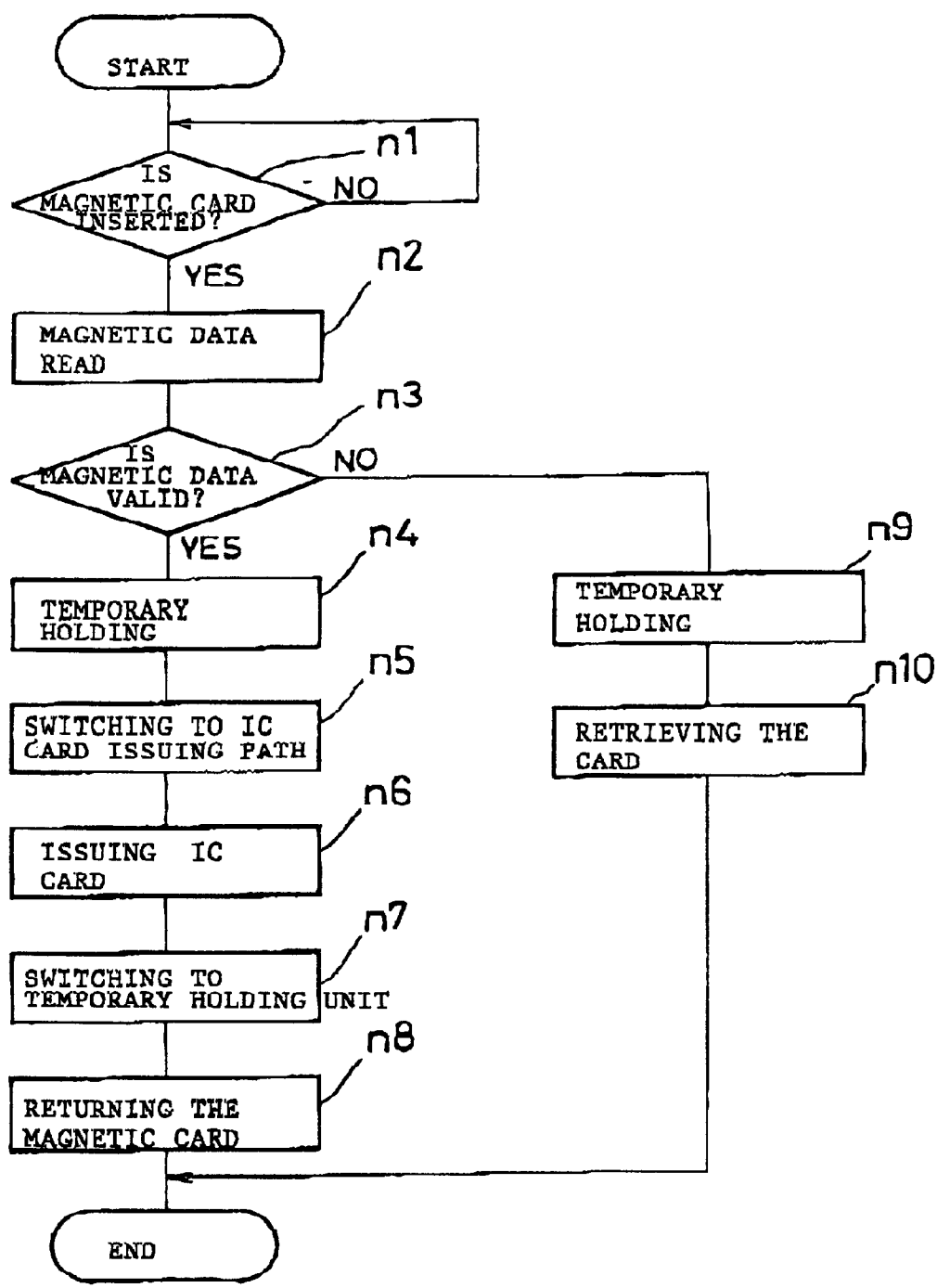
FIG. 4 illustrates a flow chart of the operation of the card issuing device.

The data processing performed in the card issuing device 11 disclosed above is shown in the flow chart in FIG. 4.

This flow chart shows an example when a bank customer uses this card issuing device 11 in the electronic money system. In this case, a certain amount of funds are transferred from the bank account of the magnetic card to the new IC card.

Magnetic card c2 is inserted into card slot 12. The card transportation sensor S detects, and CPU 31 activates main transportation motor M1 by the detection at sensor S. Magnetic card c2 is forwarded in the card transportation path 13p (step n1).

When magnetic card c2 passes through magnetic card head 16, the magnetic data recorded on the magnetic stripe of card magnetic card c2 is read (steps n2–n3).

The CPU 31 judges if the read data is correct, and if yes, magnetic card c2 is forwarded to the temporary card holding unit 19 to hold the magnetic card c2 (step n4).

When the CPU 31 allows the issue of an IC card 21, the elevator unit 20 in the temporary status is then lowered, and card issuing path 18p is leveled to the card transportation path 13p and the bottom of card issuing unit 15 (step n5).

After the entire card path for issuing the IC card is prepared, the card issuing motor M3 is driven to dispense an IC card c1 from IC card cassette 22. The dispensed card c1 is transported ahead through the card issuing path 18p and card transportation path 13p. After the transferred amount from the bank account is recorded to the IC card c1 by IC card contact head 17, the IC card c1 is issued from card slot 12 (step n8).

After the IC card c1 is issued, as shown in FIG. 1, elevator unit 20 is brought up to level the temporary card holding unit 19 to the card transportation path 13p in order to reset to the original position for waiting for the next magnetic card to be inserted (step n7).

After this step, card holding and retrieving motor M4 and main transportation motor M1 are driven in the reverse direction to return the magnetic card c1 held in the temporary card holding unit 19 from the card slot 12, and the transaction is completed (step n8).

If the data read from the magnetic card is judged as invalid or illegal data, card holding and retrieving motor M4 is driven in the direction for retrieving the magnetic card c2 to transport it from the temporary card holding unit 19 to the card retrieving box 21 (step n9–n10).

Because the card transportation path unit 13 is followed by the card path switching unit 14 which is switchable to function as either the card issuing path section or the temporary card holding unit, the card slot and the card transportation path are followed by different paths. This configuration enables the processing of two different cards efficiently, so as to return the first received magnetic card after the IC card is issued. This enables the building the card path to be more compact, and at a lower cost.

Because the IC issuing path and the card holding unit are stacked in the vertical direction, it is easy to switch the path without damaging the card specially if the card is not easily bent while switching. The card issuing device according to this invention can easily retrieve the invalid and illegal cards from the temporary cardholding unit directly to the retrieving box. Since the card issuing path and the temporary card holding unit are configured by a single unit block, it is easy for the maintenance people to take the retrieved cards out, and to perform the maintenance work. If the type of the cards to be issued is changed, it is only necessary to replace the unit block according to the new type of card.

Other embodiments of the invention will be apparent to those skilled in the art from a consideration of the specification and the practice of the invention disclosed herein. It is intended that the specification be considered as exemplary only, with the true scope and spirit of the invention also being indicated by the following claims.

What is claimed is:

1. A data media processing device to process data on a data media which is provided with a transportation path positioned immediately behind a data media slot to insert, return, and issue said data media therefrom, comprising:

a data processing unit to process said data media;

a first data media issuing unit to stack a plurality of a first data media to be issued;

a first data media issuing path section having a first data media issuing path positioned in front of said first data media issuing unit that issues said first data media;

a temporary media holding unit to hold a second data media temporarily, which is inserted from said data media slot; and a media path switching mechanism to switch to either said first data media issuing path section or said temporary media holding unit, such that either of which follows the transportation path, wherein said first data media issuing path section and said temporary media holding unit are stacked on top of each other in a vertical direction, and said first data media issuing path section and said temporary media holding unit are switchable and selectively positioned to follow to and from the transportation path and said data media slot.

2. The data media processing device according to claim 1, wherein said first data media issuing path section and said temporary media holding unit are switchable by activating a rack and pinion mechanism.

3. The data media processing device according to claim 1, wherein said temporary media holding unit comprises a media retrieving unit to retrieve said second data media when said second data media is to be collected.

4. The data media processing device according to claim 1, wherein said temporary media holding unit holds said second data media until said first data media is issued, and said temporary media holding unit returns said held second data media thereafter.

5. The data media processing device according to claim 1, wherein said first data media issuing path section and said temporary media holding unit form an elevator unit, and said elevator unit being formed as a single block which is replaceable for maintenance purposes.

6. The data media processing device according to claim 1, wherein said first data media is an IC card, and said second data media is a magnetic card.

7. A data card issuing method that issues a first data card after reading a second data card, the method comprising the steps of:

receiving the second data card that is inserted from a card insert slot;

checking the received second data card to determine whether the second data card is valid or not;

forwarding the received second data card through a card transportation path into a temporary holding unit if the second data card is determined to be valid;

switching the temporary holding unit to a card issuing path section which forwards the first data card that is stacked in a first data card cassette, by lowering the temporary holding unit in which the second data card is held and lowing the card issuing path section such that the card issuing path section is level with a bottom of the first data card cassette;

issuing the first data card from the first data card cassette through the card issuing path, the card transportation path, and the card insert slot;

switching back the card issuing path section to the temporary holding unit, in which the second data card is held, by raising the card issuing path section and the temporary holding unit; and returning the second data card, held in the temporary holding unit, through the card transportation path and the card insert slot.

* * * * *